United States Patent [19]
Van Gerwen et al.

[11] Patent Number: 5,278,900
[45] Date of Patent: Jan. 11, 1994

[54] DIGITAL ECHO CANCELLER COMPRISING A DOUBLE-TALK DETECTOR

[75] Inventors: Petrus J. Van Gerwen; Hendrik J. Kotmans; Franciscus A. M. van de Laar, all of Eindhoven, Netherlands

[73] Assignee: U.S. Philips Corporation, New York, N.Y.

[21] Appl. No.: 680,485

[22] Filed: Apr. 4, 1991

[30] Foreign Application Priority Data

Apr. 27, 1990 [NL] Netherlands .................. 9001016

[51] Int. Cl.$^5$ .................................. H04M 9/08
[52] U.S. Cl. .................................. 379/410; 379/411; 379/406; 379/390; 370/32.1
[58] Field of Search ............... 379/411, 390, 391, 392, 379/406, 407, 410; 370/32.1

[56] References Cited

U.S. PATENT DOCUMENTS

| | | | |
|---|---|---|---|
| 4,894,820 | 1/1990 | Miyamoto et al. | 379/410 X |
| 4,903,247 | 2/1990 | Van Gerwen et al. | 367/135 |
| 4,951,269 | 8/1990 | Amano et al. | 379/406 X |

OTHER PUBLICATIONS

Mansour et al., "Unconstrained Frequency-Domain Adaptive Filter" IEEE Trans., Acoustics, Speed & Signal, vol. ASSP-30, No. 5 Oct. 1982, pp. 726-734.
Kellerman, "Kompensation akustischer Echos in Frequenzteilbändern", Frequenz 39 (1985) 7/8 pp. 209-215.
Clark et al, "Unified Approach to Time-and Frequency-Domain Realization of FIR Adaptive Digital Filters", IEEE Trans Acoustics, Speech . . . , Oct. 1983 pp. 1073-1083 ASSP.31, No. 5.

*Primary Examiner*—James L. Dwyer
*Assistant Examiner*—Paul A. Fournier
*Attorney, Agent, or Firm*—Anne E. Barschall

[57] ABSTRACT

A digital echo canceller has a receive path (2) and a send path (3) and comprises combining apparatus (10) for forming a send output signal [r(k)] as the difference between the signal [z(k)] applied to the send input (SI) and a replica signal [ê(t)] used for cancelling an additive echo signal [e(k)] at the send input (SI) that has developed in response to a receive input signal [x(k)] applied to the receive input (RI), which echo canceller at least includes transforming apparatus (13, 15) for transforming the receive input signal [x(k)] and the send output signal [r(k)]; transforming apparatus (14) for transforming the replica signal [ê(k)]; a digital adaptive filter (9) which has a number of filter coefficients for generating the replica signal [ê(t)] in response to the receive input signal [x(k)] and the send output signal [r(k)], adaptation apparatus (12) for determining for each block m, adaptation components [A(p;m)] for each of the filter coefficients [W(p;m)] in response to the receive input signal [x(k)] and the send output signal [r(k)]; controllable gate means (17) for selectively passing the adaptation components [A(p;m)] to the adaptive digital filter (9); control apparatus (25-28, 21-24, 16) for determining respective levels of the send output signal [r(k)] and the receive input signal [x(k)] and for generating a control signal for the gate apparatus (17) in response to the levels thus determined, which control signals depend in a predetermined manner on the difference between the levels concerned.

8 Claims, 2 Drawing Sheets

DIGITAL ECHO CANCELLER COMPRISING A DOUBLE-TALK DETECTOR

The invention relates to a digital echo canceller which has a receive path between a receive input and a receive output and a send path between a send input and a send output, which echo canceller comprises combining means for forming a send output signal as the difference between the signal applied to the send input and a replica signal used for cancelling an additive echo signal at the send input that has developed in response to a receive input signal applied to the receive input, this echo canceller at least comprising:

first transforming means for performing an N'-point Discrete Orthogonal Transform (DOT) of each block m of N' time-domain points of the receive input signal;

second transforming means for performing an N'-point DOT of each block m of N' time-domain points of the send output signal;

third transforming means for performing an N'-point Inverse Discrete Orthogonal Transform (IDOT) of each block m of N' frequency-domain points of the replica signal;

a digital frequency-domain block-adaptive filter having a block length of N' components, in which for each signal block m a number of N' frequency-domain filter coefficients W(p;m) is available with p=0, 1, 2, ..., N'−1 for generating the replica signal as an estimate of the echo signal in response to the receive input signal and the send output signal;

adaptation means for determining for each block m adaptation components for each of the filter coefficients in response to the receive input signal and the send output signal;

controllable gate means for selectively passing the adaptation components to the adaptive digital filter;

control means for determining respective levels of the send output signal and a second signal and for generating a control signal for the gate means in response to the levels thus determined, which control signal depends in a predetermined manner on the difference between the levels concerned.

An echo canceller of such a structure is known from European Patent Application EP-A-0 301 627. The echo canceller described in that Patent Application is especially arranged for preventing the disturbing influence of double-talk on the echo canceller adjustment. Double-talk occurs when a desired signal to be transmitted and an echo signal are simultaneously applied to the send input. The super-positioning of these signals then entails that the adjustment of the echo canceller for cancelling the echo signal can be deranged considerably by the desired signal to be transmitted that is also present. This means that the replica produced by the echo canceller no longer sufficiently cancels the current echo signal. In the above Patent Application a robust solution is given for the problem of a possible derangement of the echo canceller caused by double-talk. For this purpose a combination is used consisting of a time-domain digital filter comprising a programmable filter coefficient memory, which filter forms the proper echo cancelling signal, and a digital frequency-domain block-adaptive filter (FDAF). These two filters each generate a replica signal and as long as the replica signal generated by the frequency-domain block-adaptive filter is a better estimate of the echo signal than the replica generated by the programmable filter, the filter coefficients of the frequency-domain block-adaptive filter are transferred to the programmable filter. During double-talk the adjustment of the frequency-domain block-adaptive filter is disturbed and the transfer of the filter coefficients is interrupted by the gate means. In this way the adjustment of the frequency-domain block-adaptive filter does not disturb the operation of the programmable filter for proper echo cancellation during double-talk.

In some cases it may be inconvenient that the structure of the prior-art echo canceller is rather complex and for this reason it is an object of the present invention to provide for these cases an echo canceller whose echo-cancelling properties are better than those of the prior-art echo canceller but which nevertheless has an essentially simpler structure.

Therefore, a digital echo canceller according to the invention is characterized in that the second signal is the receive input signal, in that the control and gate means operate in the frequency domain and in that a separate control signal is determined for each of the N' frequency-domain points in dependence on the respective levels of the receive input signal and the send output signal for the frequency-domain point concerned.

The measures according to the invention result in that the adjustment of the frequency-domain block-adaptive filter is blocked only in the sections of the echo canceller which represent a frequency band in which a disturbance occurs due to double-talk, whereas the adjustment for obtaining a minimum error signal still proceeds in the remaining sections. This is advantageous in that, when double-talk has terminated, only several filter coefficients will show a distinct deviation from the value desired for an optimal error correction at that moment, whereas the remaining filter coefficients of the sections in which the adjustment has not been blocked already have the desired value. Unlike the case with the prior-art echo canceller, it is in this case not necessary to provide means for storing the filter coefficients valid immediately prior to the occurrence of double-talk in order to use them as new filter coefficients after double-talk has ended. This leads to an essential simplification of the echo canceller, inter alia because no use is made of a time-domain programmable filter.

It should be observed that the article entitled: "Kompensation akustischer Echos in Frequenzteilbänder" by W. Kellermann, in Frequenz, Vol. 39 (1985), No. 7/8, pp. 209–215, describes a transversal filter intended for echo cancellation in a telephone system, in which filter the signals to be processed are subdivided into a number of frequency bands which have each their own transversal adaptive filter. This article does not mention at all the problems occurring with double-talk. The principle forming the underlying thought of the present invention can also be advantageously used in an echo canceller of the type described in above article.

Therefore, the invention also provides a digital echo canceller which has a receive path between a receive input and a receive output and a send path between a send input and a send output, which echo canceller comprises combining means for forming a send output signal as the difference between the signal applied to the send input and a replica signal used for cancelling an additive echo signal at the send input that has developed in response to a receive input signal applied to the receive input, this echo canceller at least comprising:

first filter means for transforming the frequency band of the receive input signal into Q consecutive frequency bands;

second filter means for transforming the frequency band of the send output signal into Q consecutive frequency bands;

third filter means for assembling a single frequency band from the Q consecutive frequency bands of the replica signal;

a digital transversal adaptive filter comprising Q filter sections having a number of filter coefficients for each frequency band, for generating for each frequency band a replica signal that is an estimate of the echo signal for the frequency band concerned in response to the receive input signal and the send output signal;

adaptation means for determining adaptation components for the filter coefficients of each section on the basis of the receive input signal and the send output signal;

controllable gate means for selectively passing adaptation components to the adaptive digital filter;

control means for determining respective levels of the send output signal and a second signal and for generating in response to the levels thus determined a control signal for the gate means which control signal depends in a predetermined manner on the difference between the levels concerned, characterized in that the second signal is the receive input signal and in that the control means and gate means determine a separate control signal for each of the Q frequency bands in dependence on the respective levels of the receive input signal and the send output signal for the frequency band concerned.

In a similar fashion, for each of the Q frequency bands, a time-domain comparison may be effected between the normalized power of the receive input signal and that of the send output signal, the adaptation of the filter coefficients in the adaptive filter section belonging to a specific frequency band being interrupted once it has appeared that the power of the send output signal increases relative to that of the receive input signal, which is an indication, as extensively discussed hereinbefore, that double-talk occurs in the frequency band concerned.

In the following the invention will be further explained with reference to the drawing, in which.

In the drawing Figures corresponding elements are denoted by the same reference numerals.

Figure 1:
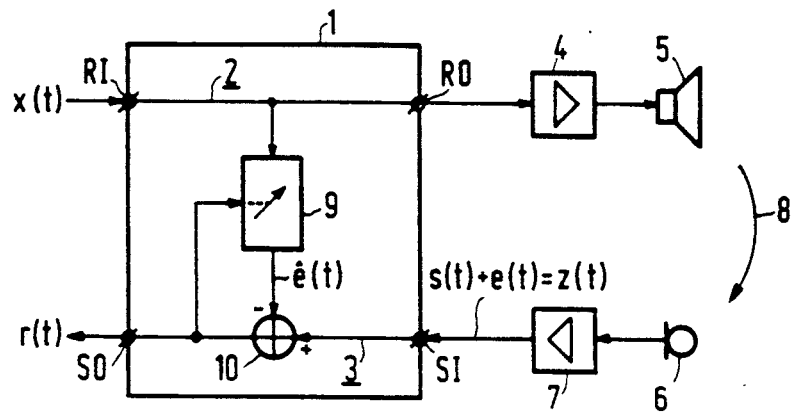
FIG. 1 shows a diagram by way of illustration of the manner in which an echo canceller is generally used in a set used for sending and receiving speech signals.

FIG. 1 shows a simplified block diagram of an echo canceller used in a telephone set with loudspeaker reproduction of a received speech signal. Such an echo canceller 1 has a receive path 2 with a receive input RI and a receive output RO, as well as a send path 3 with a send input SI and a send output SO. A receive input signal $x(t)$, to be referred to as far-end signal in the following, is applied to receive input RI and transferred over receive path 2 to receive output RO which is connected to a loudspeaker 5 by means of a receive amplifier 4. In the absence of a far-end signal, a microphone 6 generates a desired signal to be transmitted which is applied as a send input signal $s(t)$, to be referred to as near-end signal in the following, to send input SI through a send amplifier 7. This near-end signal $s(t)$ is transmitted over send path 3 to send output SO. Between loudspeaker 5 and microphone 6 there is an acoustic echo path, symbolically represented in FIG. 1 by an arrow 8. Over this acoustic echo path 8 a far-end signal $x(t)$ at receive output RO, if present, may introduce an undesired additive echo signal $e(t)$ at send input SI through the microphone 6, so that a sum signal $z(t)=s(t)+e(t)$ is applied to send input SI. Echo canceller 1 has now for its task to cancel in the best possible way this undesired echo signal $e(t)$. For this purpose, echo canceller 1 comprises a filter 9 which in response to far-end signal $x(t)$ on receive path 2 generates a signal $\hat{e}(t)$ that is an estimate of the undesired echo signal $e(t)$. By means of a combining circuit 10 this signal $\hat{e}(t)$ is subtracted from the sum signal $z(t)=s(t)+e(t)$ at send input SI for forming a send output signal $r(t)$ which can be written as:

$$r(t) = s(t) + [e(t) - \hat{e}(t)]$$

From this expression it appears that signal $r(t)$ at send output SO represents the desired signal $s(t)$ to be transmitted when replica signal $\hat{e}(t)$ is a reliable estimate of echo signal $e(t)$, because in that case the second term of the right-hand side of this expression will practically be equal to zero. In general the transfer characteristic of the echo path between receive output RO and send input SI will vary with time, and especially acoustic echo path 8 may show large variations. Since echo signal $e(t)$, in a good approximation, may be considered to be the linear convolution of far-end signal $x(t)$ with the impulse response $h(t)$ of the echo path between receive output RO and send input SI, the shape of time-varying impulse response $h(t)$ will lead to corresponding variations of echo signal $e(t)$ at send input SI. Filter 9 in echo canceller 1 is therefore arranged as an adaptive filter which has for its task to make its impulse response $w(t)$ substantially equal to impulse response $h(t)$ of echo path RO-SI. The adaptive adjustment of this filter 9 is controlled by signal $r(t)$ at the output of combining circuit 10. This adaptive adjustment is continued as long as there is a correlation between control signal $r(t)$ and far-end signal $x(t)$. When only far-end signal $x(t)$ is present (and thus, near-end signal $s(t)=0$), adaptive filter 9 will generate a replica signal $\hat{e}(t)$ which is a reliable estimate of echo signal $e(t)$. However, when both far-end signal $x(t)$ and near-end signal $s(t)$ are present, a situation will arise which is commonly referred to as double-talk. If no appropriate measures are taken, the adjustment of adaptive filter 9 may be considerably deranged during double-talk due to the presence of near-end signal $s(t)$ as a disturbing term in control signal $r(t)$. This misadjustment of adaptive filter 9 leads to a replica signal $\hat{e}(t)$ which is no longer a reliable estimate of echo signal $e(t)$ so that at send output SO a signal $r(t)$ will occur which is disturbed to an annoying degree by an echo signal which has been cancelled insufficiently or even incorrectly.

Since the present invention relates to a digital echo canceller, a discrete-time modelling will be utilized in the following description. The simplest manner in which such a modelling may be obtained is to assume that in the diagram of FIG. 1 the signals $x(t)$ and $z(t)$ are applied to receive input RI and send input SI via analog-to-digital converters (not shown), the signals x(t) and r(t) at receive output RO and send output SO are derived by means of digital-to-analog converters (not shown) and to assume that all further relevant signals in echo canceller 1 are digital signals. These digital signals are denoted in the conventional manner so that, for example, x(k) is a quantized sample of continuous-time signal x(t) at instant $t=kT$, where $1/T$ is the sampling frequency.

If an echo canceller is used for cancelling strongly auto-correlated signals, such as speech, adaptive frequency-domain filters are advantageous in that the convergence properties may be improved considerably. By transforming to the frequency-domain, the gain factor for each of the substantially orthogonal frequency-domain components can then be normalized in a simple manner in accordance with the power of the frequency-domain component concerned. It is also possible in the frequency-domain to considerably reduce the complexity of long filters by performing efficient Fourier transforms. Consequently, adaptive frequency-domain filters are extremely attractive to use in acoustic echo cancellers, because in these cancellers it is necessary to copy impulse responses of great length. Therefore, the digital echo canceller with double-talk detection according to the invention will be assumed to be a digital echo canceller comprising an adaptive frequency-domain filter in the following.

Figure 2:
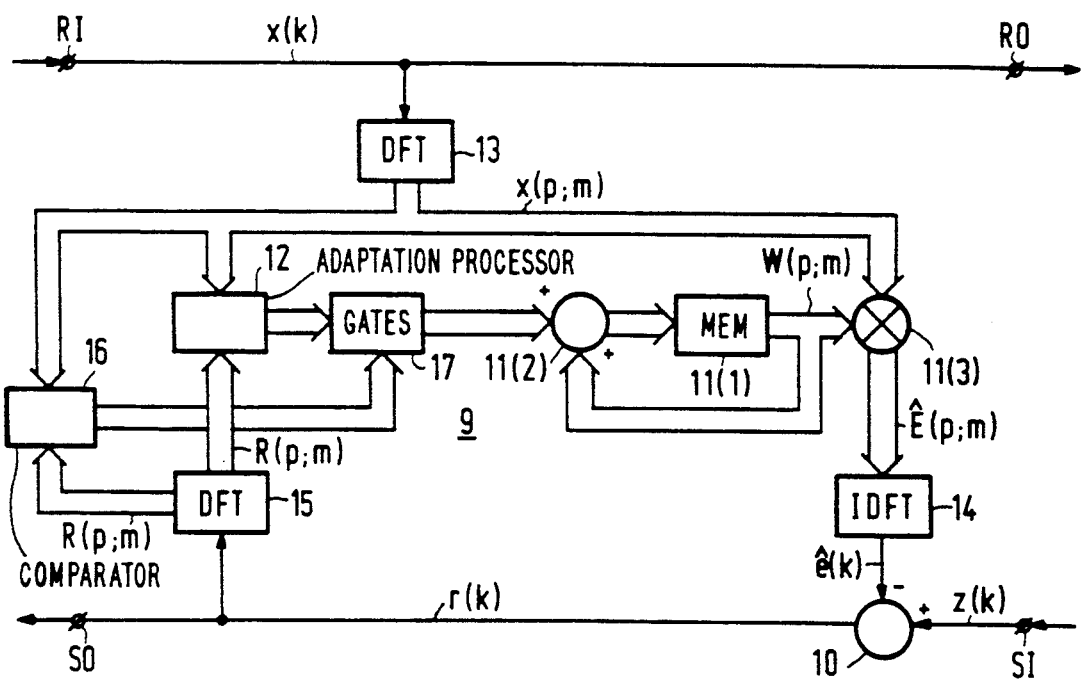
FIG. 2 shows a general diagram of a discrete-time model of an embodiment of an echo canceller according to the invention.
Figure 3:
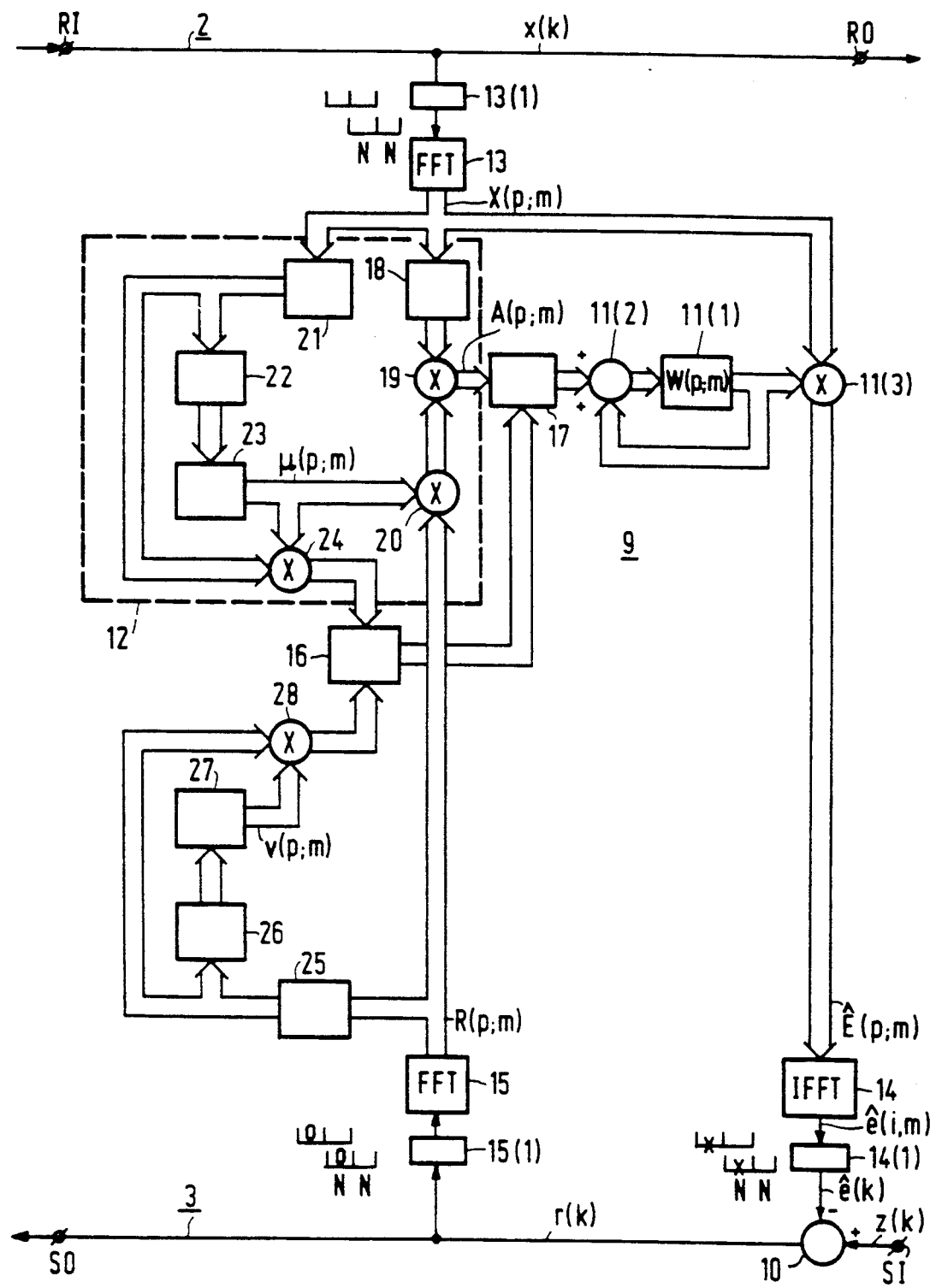
FIG. 3 shows a detailed diagram of a discrete-time model of an embodiment of the echo canceller according to the invention.

FIG. 2 shows in a diagrammatic manner the general structure of a frequency-domain block-adaptive filter 9. In FIGS. 2 and 3 double-line signal paths denote paths in the frequency-domain over which paths blocks of frequency-domain points are transmitted, and single-line signal paths denote paths in the time-domain. Transformations from the time-domain to the frequency-domain and vice versa take place by means of Discrete Orthogonal Transforms (DOT's) or their Inverses (IDOT's). An illustrative example of such transformation is the Discrete Fourier Transform (DFT) and its inverse (IDFT), which are widely utilized and, for example, extensively discussed in an article entitled "A Unified Approach to Time- and Frequency-Domain Realization of FIR Adaptive Digital Filters" by G. A. Clark et al., published in IEEE Transactions on Acoustics, Speech and Signal Processing, Vol. ASSP-31, No. 5, October 1983, pp. 1073-1083 and in an article entitled "Unconstrained Frequency-Domain Adaptive Filter" by D. Mansour et al., published in IEEE Transactions on Acoustics, Speech and Signal Processing, vol. ASSP-30, No. 5, October 1982, pp. 726-734. From practical considerations of computational complexity and permissible signal delays these DOT's have a finite block length N' and in the literature such transformations are known as N'-point DOT's, where "point" may refer to a discrete time-domain component and to a discrete frequency-domain component. With respect to the block length N' the following observation is made. FDAF 9 has to generate a replica signal ê(k) which is a good estimate of echo signal e(k). Echo signal e(k), in its turn, may be considered to be a linear convolution of far-end signal x(k) with impulse response h(i) of echo path 8 with $i=0, 1, 2, \ldots, N-1$. It need not be further clarified that FDAF 9 then also has to present an impulse response of a length N for generating replica signal ê(k) as a linear convolution of far-end signal x(k) with the impulse response of FDAF 9. The operations necessary for this purpose are performed in FDAF 9 on blocks of N' points in the frequency-domain, and it is well known that these operations correspond with a circular convolution in the time-domain, in which the period is equal to the block length N'. The desired linear convolution can then be obtained by suitably sectioning of the time-domain signals involved in the N'-point DOT's, while the most current segmenting procedures are the overlap-save method and the overlap-add method. The above implies that, generally, the block length N' of the DOT's is larger than the desired length N of the impulse response of FDAF 9. In the above article by Clark et al. it is stated that for the most efficient implementation of FDAF 9 with an impulse response of length N, DFT's having a block length of $N'=2N$ are used and time-domain signals are sectioned into blocks of $N'=2N$ points, where each block overlaps the previous block by N points. For large values of N, for example, $N=1000$ to $N=2000$ in the present case of acoustic echo paths 8, the computational complexity can yet be reduced considerably by utilizing efficient implementations of the DFT's known as "Fast Fourier Transform" (FFT), due to which the number of computational operations per N points of replica signal ê(k) are of the order of N log N. Such computationally efficient implementations are also known for other types of DOT's than the DFT, but for simplicity it will always be assumed in the following that the N'-point DOT is an N'-point DFT with $N'=2N$. Furthermore, frequency-domain signals will be denoted by upper-case letters in order to distinguish in a simple manner between frequency-domain and time-domain signals, the time-domain signals being denoted by lower-case letters as has been done in the foregoing. Finally, the further description is aimed at using the overlap-save method as a procedure of sectioning the time-domain signals.

The FDAF 9 shown in FIG. 2 comprises a filter section 11 and an adaptation processor 12. Filter section 11 and adaptation processor 12 operate in the frequency domain so that three domain transformations are to be performed, that is to say:

by transforming means 13 and associated sectioning means: a 2N-point DOT for transforming each block of 2N time-domain points of far-end signal x(k) into a block of 2N frequency-domain points, which are denoted X(p;m) with $p=0, 1, 2, \ldots, 2N-1$ for a block having block number m;

by transforming means 14 and associated sectioning means: a 2N-point IDOT for transforming each block of 2N frequency-domain points Ê(p;m) into a block of N time-domain points of replica signal ê(k);

by transforming means 15 and associated sectioning means: a 2N-point DOT for transforming each block of N time-domain points of error signal r(k), after it has been augmented to a block of 2N Time-domain points, into a block of 2N frequency-domain points R(p;m).

The details of the overlap-save method used for the sectioning procedure will further be explained with reference to FIG. 3. Filter section 11 of FDAF 9 comprises a memory 11(1) for storing the 2N frequency-domain filter coefficients W(p;m) of block m, a combining circuit 11(2) for adding together the output signal of memory 11(1) and the output signal of the adaptation processor 12, and a circuit 11(3) for multiplying each frequency-domain point X(p;m) by an associated frequency-domain filter coefficient W(p;m) in order to form products X(p;m)W(p;m) which represent the 2N frequency-domain points Ê(p;m). Adaptation processor 12 is arranged for producing block-by-block adaptation signals for the frequency-domain filter coefficients W(p;m) in response to the 2N frequency-domain points X(p;m) and R(p;m), which adapted filter coefficients W(p;m) are stored in memory 11(1).

As described hereinbefore, the adjustment of the filter coefficients in the filter coefficient memory 11(1) may be considerably disturbed in the case of double-talk and, therefore, the supply of the adaptation signal from adaptation processor 12 to filter section 11 is always interrupted by gate means 17 once a situation of double-talk for a frequency-domain component has been detected by means of a comparator 16. According to the invention the double-talk detector comprising gate means 17 and the comparator 16 is also implemented in the frequency-domain so that each frequency-domain component has its own double-talk detector. Consequently, it may be provided that during double-talk the adaptation of the filter coefficients is interrupted only for the filter coeffients which belong to frequency-domain points at which double-talk occurs.

Since speech has a discrete line spectrum for most voiced sounds, probably only a restricted number of frequency-domain points will be disturbed as a result of double-talk. Therefore, double-talk detection per frequency-domain point according to the invention is advantageous in that, when the situation of double-talk has terminated in course of time, only a restricted number of filter coefficients in the filter coefficient memory 11(1) is not adaptively adjusted during the period of double-talk, so that for this restricted number of filter coefficients a relatively large adaptive adjustment may be necessary. The remaining filter coefficients will be adaptively adjusted in a normal fashion for the whole period of double-talk, or at least for part of the period, so that the disturbance of the replica signal due to double-talk is minimized. Another advantage is, as will be explained hereinbelow, that when double-talk is detected according to the invention, the power control already present in the FDAF may be used efficiently.

In order to avoid that various filter coefficients are already deranged due to double-talk before the gate means 17 block a further derangement, it is desirable that the comparator 16 can react fast to a sudden large change in the send output signal which, as has appeared, is a certain indication of the occurrence of double-talk.

FIG. 3 is a more detailed representation of the structure of the adaptation processor 12 and the circuit for generating the input signals for the comparator 16. FIG. 3 also shows explicitly that the N'-point DOT is an efficient implementation of an N'-point DFT, with N'=2N, known as 2N-point FFT, and in which the sectioning means are shown separated from the transforming means so as to properly describe their function.

The structure of the adaptation processor is, in essence, equal to that described in aforementioned European Patent Application EP-A-0 301 627.

In FIG. 3 a far-end signal x(k) is applied to sectioning means 13(1) to be subdivided into blocks of 2N points by means of a serial-to-parallel conversion, each block overlapping its predecessor by N points, as is shown symbolically in the Figure. The points of a block having block number m are denoted x(i;m) with i=1, 2, ..., 2N−1. With the aid of transforming means 13 for performing a 2N-point FFT the 2N time-domain points x(i;m) are transformed into 2N points X(p;m) with p=1, 2, ..., 2N−1 in frequency-domain. In multiplier 11(3) each point X(p;m) is multiplied by an associated filter coefficient W(p;m) from memory 11(1) so as to form products X(p;m)W(p;m) which represent 2N points Ê(p;m). With the aid of transforming means 14 for performing a 2N-point IFFT these 2N points Ê(p;m) are transformed into 2N points ê(i;m) in the time domain. Since the filter coefficients W(p;m) may be considered points of a 2N-point DFT performed on time-domain filter coefficients w(i;m) which represent values of impulse response w(i) during block m, the multiplication in circuit 11(3) corresponds with a time-domain circular convolution of far-end signal vector x(m) during block m with impulse response w(i) during block m. The desired replica signal vector ê(m), however, is the linear convolution of far-end signal x(k) with impulse response w(i). In accordance with the overlap-save method this desired replica signal ê(k) is now obtained by applying the 2N points ê(i;m) of this circular convolution for each block m to sectioning means 14(1) in which by means of a parallel-to-serial conversion the first N points ê(i;m) with i=0, 1, 2, ..., N−1 are discarded and the last N points ê(i;m) with i=N, N+1, N+2, ..., 2N−1 are transferred as replica signal ê(k), as is shown symbolically in FIG. 3.

For the block-by-block adaptation of the frequency-domain filter coefficients W(p;m), a known adaptation algorithm is utilized, for example, a complex Least Mean Square (complex LMS) algorithm. In accordance with the latter algorithm the filter coefficients W(p;m) are adapted as long as a correlation occurs between far-end signal x(k) and error signal r(k). Since adaptation processor 12 operates in the frequency-domain, according to the overlap-save method this error signal r(k) is applied to sectioning means 15(1) to be subdivided by means of serial-to-parallel conversion into blocks of 2N points, each block overlapping its predecessor by N points and the value of zero being forced onto the first N points r(i;m), with i=0, 1, 2, ..., N−1, as is symbolically shown in FIG. 3. With the aid transforming means 15 for performing a 2N-point FFT these 2N points r(i;m) are transformed into the frequency-domain in 2N points R(p;m).

Each of the 2N points R(p;m), is multiplied in a multiplier 20 by a factor of $2\mu(p;m)$, which determines the gain factor in the adaptation algorithm, so that a product $2\mu(p;m)R(p;m)$ is formed. The 2N points X(p;m) of each block m are applied to conjugating means 18 for forming the complex conjugate value $X^*(p;m)$ of each point X(p;m). In a multiplier 19 each conjugate point $X^*(p;m)$ is multiplied by the output signal of multiplier 20 for the associated point R(p;m) so as to form the products:

$$A(p;m) = 2\mu(p;m)X^*(p;m)R(p;m)$$

which correspond with the time-domain circular correlation between far-end signal x(k) and error signal r(k) during block m; the product A(p;m) determines the modification of filter coefficient W(p;m). If the gate means 17 are not activated which, as will be explained in the following, is the case as long as double-talk does not occur for the frequency-domain component concerned, these modifications A(p;m) are applied to the (accumulator) circuit formed by memory 11(1) for storing the filter coefficients W(p;m) of block m and an adder 11(2) for forming the sum of each coefficient W(p;m) and its associated modification A(p;m), which sum is stored in memory 11(1) to provide the filter coefficients W(p;m+1) for the next block (m+1). The adaptation algorithm can thus be written as:

$$W(p;m+1) = W(p;m) + 2\mu(p;m)X^*(p;m)R(p;m).$$

The 2N filter coefficients W(p;m) in memory 11(1) are thus available for the multiplications in circuit 11(3).

If the far-end signals x(k) are uncorrelated or only slightly correlated, gain factor $\mu(p;m)$ may have a same constant value $\alpha$ for each filter coefficient W(p;m), which value $\alpha$ is independent of the block number m (this constant $\alpha$ is known as the adaptation factor of the algorithm). For strongly (auto)correlated far-end signals x(k), such as speech, the convergence speed of the FDAF may be considerably increased in a simple manner by decorrelating the far-end signals x(k) which, as is known per se, may be effected by normalizing their power spectrum; cf., for example, page 36 of the article entitled "Echo Cancellation Algorithms" by C. W. K. Gritton and D. W. Lin, published in IEEE ASSP Magazine, April 1984, pp. 30-38. Since the frequency-domain components X(p;m) are already available in the FDAF, such a normalization can be simply realized with the aid of normalizing means 23 in which the adaptation factor $\alpha$ is divided by the power $[X(p;m)]^2$ of point X(p;m), which power is formed in squaring circuit 21 and is smoothed blockwise by means of a simple low-pass filter 22 whose bandwidth is selected so that the convergence behaviour of the whole system is in essence determined by the time constant of the adaptive filter. The output signal of the normalizing means 23 may then be used as a gain factor $\mu(p;m)$ for the multiplication by $2\mu(p;m)$ in circuit 20.

For detecting double-talk for each of the 2N frequency components p, a gain factor v(p;m), which is normalized in accordance with the power in the frequency component R(p;m), is determined in an identical manner. This is effected by normalizing means 27 in which the adaptation factor $\alpha$ is divided by the power $[R(p;m)]^2$ of point R(p;m) formed in squaring circuit 25 and smoothed blockwise by means of a simple low-pass filter 26. The output signal of the normalizing means 27 can then be used as the gain factor v(p;m) for the multiplication by the output signal $[R(p;m)]^2$ of circuit 25 in multiplier 28.

The output signal $v(p;m) \cdot [R(p;m)]^2$ of multiplier 28 is compared to the output signal $\mu(p;m) \cdot [X(p;m)]^2$ of multiplier 24 in a comparator circuit 16. For, if the frequency component R(p;m) is disturbed in the case of double-talk, the power in R(p;m) will increase and the following will hold:

$$v(p;m) \cdot [R(p;m)]^2 > \mu(p;m) \cdot [X(p;m)]^2.$$

If this condition is satisfied, circuit 16 will produce an output signal for activating the gate means 17, so that these means will interrupt the transfer of adaptation components A(p;m) from multiplier 19 to summing circuit 11(2).

In the manner described above, the adjustment of the adaptation factors is interrupted only in a restricted number of the 2N adaptation factor control circuits, that is to say, only in the control circuits belonging to a frequency component for which double-talk is detected.

On reading the aforementioned and the article by W. Kellermann, those skilled in the art will readily recognize in what manner the principle of the present invention may be implemented in an echo canceller of the type described in said article.

It should further be observed that the above embodiment for transformation to the frequency-domain may advantageously be combined with the echo canceller known from European Patent Application EP-A-0 301 627 and wherein a combination of a FDAF and a TDAF is used. The echo canceller formed by such a combination then has the advantage that both a perfect echo cancellation in case of double-talk is provided and the delay inherent in the presence of a FDAF is avoided.

We claim:

1. Digital echo canceller which comprises:
   a receive path between a receive input and a receive output and
   a send path between a send input and a send output;
   combining means for forming a send output signal as the difference between the signal applied to the send input and a replica signal used for cancelling an additive echo signal at the send input that has developed in response to a receive input signal applied to the receive input;
   first transforming means for performing an N'-point Discrete Orthogonal Transform (DOT) of each block m of N' time-domain points of the receive signal;
   second transforming means for performing an N'-point DOT of each block m of N' time-domain points of the send output signal;
   third transforming means for performing an N'-point Inverse Discrete Orthogonal Transform (IDOT) of each block m of N' frequency domain points of the replica signal;
   a digital frequency-domain block-adaptive filter having a block length of N' components, in which for each signal block m a number of N' frequency-domain filter coefficients W(p;m) is available with p=0, 1, 2, ..., N'−1 for generating the replica signal as an estimate of the echo signal in response to the receive input signal and the send output signal;
   adaptation means for determining for each block m adaptation components for each of the filter coefficients in response to the receive input signal and the send output signal;
   controllable gate means for each of the N' frequency domain points, operating in the frequency domain, for selectively passing the adaptation components for each frequency component in the m signal blocks to the adaptive digital filter;
   control means for determining respective levels of the send output signal and the receive input signal for generating a separate control signal for the gate means for each of the N' frequency domain points in response to the respective levels of the receive input signal and the send output signal for the individual frequency domain point concerned which control signal depends in a predetermined manner on the difference between the levels concerned, whereby the adjustment of the adaptation components for each filter coefficient is inhibited only for that frequency component representing double talk in the system.

2. Digital echo canceller comprising:
   a receive path between a receive input and a receive output;
   a send path between a send input and a send output;
   combining means for forming a send output signal as the difference between the signal applied to the send input and a replica signal used for cancelling an additive echo signal at the send input that has developed in response to a receive input signal applied to the receive input;

first filter means for transforming the frequency band of the receive input signal into Q consecutive frequency bands;

second filter means for transforming the frequency band of the send output signal into Q consecutive frequency bands;

third filter means for assembling a single frequency band from the Q consecutive frequency bands of the replica signal;

a digital transversal adaptive filter comprising Q filter sections having a number of filter coefficients for each frequency band, for generating for each frequency band a replica signal that is an estimate of the echo signal for the frequency band concerned in response to the receive input signal and the send output signal;

adaptation means for determining adaptation components for each of the filter coefficients of each section in response to the receive input signal and the send output signal;

controllable gate means, operating in the frequency domain, for selectively passing the adaptation components for each of the filter coefficients in a frequency band to the adaptive digital filter;

control means, operating in the frequency domain, for determining respective levels of the send output signal and the receive input signal for generating a separate control signal for the gate means for each frequency component in each of the Q frequency bands in response to the respective levels of the receive input signal and the send output signal for the individual frequency band concerned, which control signal depends in a predetermined manner on the difference between the levels concerned.

3. Digital echo canceller as claimed in claim 1, wherein the adaptation means comprise means for determining the power of the transformed receive input signal and means for determining an adaptation factor normalized according to the mean power of the receive input signal, characterized in that a multiplier is provided for multiplying the power of the transformed receive input signal by the adaptation factor, in that also means are provided for determining the power of the transformed send output signal and means for determining a gain factor normalized according to the mean power of the send output signal and a multiplier is provided for multiplying the power of the transformed send output signal by the gain factor and in that the output signals of the two multipliers are fed as input signals to inputs of the control means which comprise a comparator for comparing these two input signals.

4. Digital echo canceller as claimed in claim 3, forming a constituent part of a loudspeaking telephone set.

5. Digital echo canceller as claimed in claim 2, wherein the adaptation means comprise means for determining the power of the transformed receive input signal and means for determining an adaptation factor normalized according to the mean power of the receive input signal, including a multiplier for multiplying the power of the transformed receive input signal by the adaptation factor; means for determining the power of the transformed send output signal and means for determining a gain factor normalized according to the mean power of the send output signal; and a multiplier for multiplying the power of the transformed send output signal by the gain factor wherein the output signals of the two multipliers are fed as input signals to inputs of the control means which comprise a comparator for comparing these two input signals.

6. Digital echo canceller as claimed in claim 5, forming a constituent part of a loudspeaking telephone set.

7. A digital echo canceller comprising:
a) first means for receiving, and transforming into the frequency domain, signals from a receive path;
b) second means for receiving, and transforming into the frequency domain, signals from a send path;
c) means, operating in the frequency domain, for calculating a replica signal including:
   i) a single filter for generating frequency domain replica signals from the transformed signals received from the receive path using stored coefficients;
   ii) means for comparing the transformed send and receive signals and for detecting a situation in the send signal based on a result of the comparison;
   iii) an adaptation processor for supplying coefficients, for storage in the filter, based on the transformed send and receive signals; and
   iv) means for updating the stored coefficients when no situation is detected, wherein only selective coefficients comprising a subset of the stored coefficients are updated when the situation is detected, so that some but not all of the stored coefficients continue to be used without update when the situation is detected;
d) means for transforming the frequency domain replica signals into time domain replica signals;
e) means for subtracting the time domain replica signals, from the signals in the send path, to cancel an echo signal in the send path which results from the signals in the receive path, whereby only one adaptive filter is needed for coping with the situation.

8. The echo canceller of claim 7 wherein the situation is double talk and those stored coefficients which continue to be used without update are those which belong to frequency domain points at which double talk occurs.

* * * * *